United States Patent [19]

Konishi et al.

[11] Patent Number: 5,396,411
[45] Date of Patent: Mar. 7, 1995

[54] POWER CONVERSION SYSTEM, AND A METHOD OF POWER CONVERSION USING SUCH A POWER CONVERSION SYSTEM

[75] Inventors: Hiroo Konishi, Katsuta; Masahiko Amano, Hitachioota; Masahiro Watanabe, Hitachi, all of Japan

[73] Assignee: Hitachi, Ltd., Tokyo, Japan

[21] Appl. No.: 209,017

[22] Filed: Mar. 11, 1994

[30] Foreign Application Priority Data

Mar. 12, 1993 [JP] Japan .................. 5-051916

[51] Int. Cl.6 ........................... H02M 5/45
[52] U.S. Cl. ........................ 363/37; 363/35
[58] Field of Search .............. 363/35, 36, 37, 65, 363/71, 78, 95, 98; 323/207, 215

[56] References Cited

U.S. PATENT DOCUMENTS

| | | | |
|---|---|---|---|
| 3,832,619 | 8/1974 | Pollard | 321/5 |
| 4,330,815 | 5/1982 | Konishi | 363/35 |
| 4,441,032 | 4/1984 | Sakurai et al. | 363/71 |
| 4,862,340 | 8/1989 | Inokuchi | 363/35 |
| 4,884,182 | 11/1989 | Ando et al. | 363/37 |
| 5,272,617 | 12/1993 | Nakamura | 363/37 |

FOREIGN PATENT DOCUMENTS

| | | | |
|---|---|---|---|
| 146725 | 7/1985 | European Pat. Off. | H02M 7/757 |
| 50-138338 | 11/1975 | Japan | H02M 5/45 |
| 51-66455 | 6/1976 | Japan | H02M 5/45 |
| 51-101827 | 9/1976 | Japan | H02M 5/45 |

*Primary Examiner*—Steven L. Stephan
*Assistant Examiner*—Matthew Nguyen
*Attorney, Agent, or Firm*—Fay, Sharpe, Beall, Fagan, Minnich & McKee

[57] ABSTRACT

A power conversion system for converting between a.c. and d.c. power has a pair of line commutated converters connected in series, and each is connected to a corresponding transformer, one of which transformers is YY connected and the other of which is YΔ connected. A pair of minimum voltage detectors generate minimum voltage signals, a first one of the minimum voltage signals being YY related and a second one of the minimum voltage signals being YΔ related. The power conversion system has a control circuit which generate two phase control signals for controlling the pair of line commutated converters respectively. When a fault occurs in a.c. or d.c. apparatus connected to the power conversion system, the control circuit generates the phase control signals on the basis of the first and second minimum voltage signals respectively. In this way, each of the line commutated converters are controlled by an independent signal, so that the power conversion of each is optimized.

7 Claims, 6 Drawing Sheets

| FIG. 1(a) |
| FIG. 1(b) |

YY Primary side

1 Primary

YY Secondary side

2 Secondary

YΔ Primary side

1 Primary

YΔ Secondary side

2 Secondary

POWER CONVERSION SYSTEM, AND A METHOD OF POWER CONVERSION USING SUCH A POWER CONVERSION SYSTEM

BACKGROUND OF THE INVENTION

1. Field of the Invention

The present invention relates to a power conversion system for converting between a.c. and d.c. power. It is particularly, but not exclusively, concerned with power transmission between one a.c. system and another, where the power is transmitted in d.c. form and therefore has to be converted prior to, and after, transmission. The present invention also relates to a power transmission system incorporating such power conversion systems, to a control apparatus for such a power conversion system, and to a method of converting power using such a power conversion system.

2. Summary of the Prior Art

It is known to transmit power between two a.c. system via a d.c. power line. A power conversion system is connected between the power line and each of the two a.c. systems, to convert power from one a.c. system to d.c. power on the transmission line, and to convert the d.c. power on transmission line to a.c. power for the other a.c. system. In one known type of power converter, there is a pair of line commutated converters connected to the d.c. power line, the two line commutated converters normally being connected in series. The pair of line commutated converters are connected via a transformer system to the respective a.c. system. Normally, separate transformers are provided for each line commutated converter, but it is possible to provide a single transformer for each pair of line commutated converters if the power requirements of the transmission system are low.

The pair of line commutated converter each has thyristors, and are controlled by a suitable control circuit to achieve the desired power conversion. In an arrangement for transmitting power from one a.c. system to another via a d.c. power line, depending on the direction of power transmission, the pair of line commutated converters of one power converter are operated to form an inverter, and the pair of line commutated converters of the other power converter are operated to form a rectifier. In such arrangements, it is known for each pair of line commutated converters to operate with their phases shifted by 30°, to form a 12-pulse power converter when they are connected in series. This phase shifting suppresses lower harmonics, such as 5th and 7th harmonics, thereby increasing the efficiency of power transmission.

One function of the control circuit for each pair of line commutated converters is to control the line commutated converters when there is a fault in the system, with the aim of providing minimum power losses and enable the power transmission to continue. This is done by varying the advanced control angle of the line commutated converters so that the extinction angle thereof remains as close as possible to the normal value.

It has been proposed, e.g. in JP-A-51-66455, JP-A-50-138338 and JP-A-51-101827, for such extinction angle control to be on the basis of a minimum voltage measurement from the transformer or transformers connected to the pair of line commutated converters of each power conversion system. A phase control signal is derived from that minimum voltage, together with a d.c. voltage signal and a d.c. current signal from the line commutated converters, and the phase of both line commutated converters controlled in common by that phase control signal.

SUMMARY OF THE PRESENT INVENTION

In the known systems described above, both of the pair of line commutated converters are controlled using the same phase control signal. The phase control signal is derived from the transformer or transformers connected to the pair of line commutated converters. It has been appreciated that such an arrangement, although satisfactory control of one of the line commutated converters is achieved, the arrangement has the effect of applying a correction to the other of the line commutated converters which is not optimum for that other line commutated converter. Hence, the overall power transmission of the power conversion system is not optimum.

Therefore, at is most general, the present invention proposes that the line commutated converters are controlled independently.

In the known power conversion system, the transformer arrangement (whether formed from one or two transformers) had a first part which was YY connected and second part which was YΔ connected. Thus, in the known system, control was based on a minimum voltage derived by considering both the YY and YΔ connections together. In the present invention, however, separate minimum voltages are derived from the YY and YΔ connections. These minimum voltages are then used in separate channels to control the two line commutated converters, respectively. In this way, it becomes possible to control each line commutated converter by separate signals, leading to a better power conversion then is possible when a common control signal is used. In normal cases, minimum voltages derived from the YY and YΔ connections will be the minimum absolute values of the three-phase alternating voltage from the YY and YΔ connected transformer.

Thus, viewed from the input side of the control circuit, separate minimum voltage signals are generated from minimum voltage detectors connected respectively to the YY and YΔ parts of the transformer arrangement. On the output side of the control circuit, separate phase control signals are generated which are fed respectively to the two line commutated converters, those two phase control signals being independent of each other, and dependent on the YY and YΔ parts of the transformer system. Within the control circuit, there are then two independent channels, receiving the minimum voltage signal and outputting the phase control signal.

The detailed structure of each channel of the control circuit of the present invention may then correspond to the control circuit of the prior art. Thus, an extinction angle control circuit may receive the minimum voltage from the respective minimum voltage detector, and compare that with a d.c. current signal corresponding to the current through the pair of line commutated converters (assuming they are connected in series). That d.c. current signal may also be compared with a reference current signal in a d.c. voltage control circuit. Furthermore, the d.c. voltage across the pair of line commutated converters may also be compared with a reference voltage signal in a d.c. voltage control circuit. The extinction angle control circuit, the d.c. voltage control circuit and the current control circuit then output respective signals which are compared by a low voltage detector circuit. That low voltage detector circuit detects the minimum of the three signals and that minimum is then used to control a phase control circuit, which generates the phase control signal to the corresponding one of the pair of line commutated converters.

In one arrangement within the present invention, the two channels of the control circuit are wholly independent. It is also possible, however, for at least parts of the two channels of the control circuit to be in common. As described above, each channel has a current control circuit which receives a d.c. current signal representing the d.c. current flowing in the line commutated converters, and a current reference signal. The reference signal is the same for each channel, and therefore the current control circuit may be in common for two channels, generating an output which is fed to the low voltage detector circuit of each channel. Similarly, the d.c. voltage control circuit receives a d.c. voltage signal measured across the pair of line commutated converters, and a voltage reference signal. Since that voltage reference signal may be common to the two channels, it is thus possible for the d.c. voltage control circuit to be common to the two channels, again generating an output fed to both the low voltage detector circuits.

Although described above with reference to a power conversion system, the present invention is also applicable to a power transmission system. In such a power transmission system, first and second power conversion systems as described above are connected to opposite ends of the d.c. power line, and each power conversion system is connected to a corresponding a.c. system. This enables power to be transmitted from one a.c. system to another via the d.c. power line. One of the power conversion systems is operated as an inverter, and the other as a rectifier. Furthermore, the present invention relates to the control device for the power converter and to a method of power conversion in which control is achieved independently for two line commutated converters, using the YY and YΔ parts of the transformer.

BRIEF DESCRIPTION OF THE DRAWINGS

Embodiments of the present invention will now be described in detail, by way of example, with reference to the accompanying drawings, in which.

DETAILED DESCRIPTION

Figures 1, 1A:
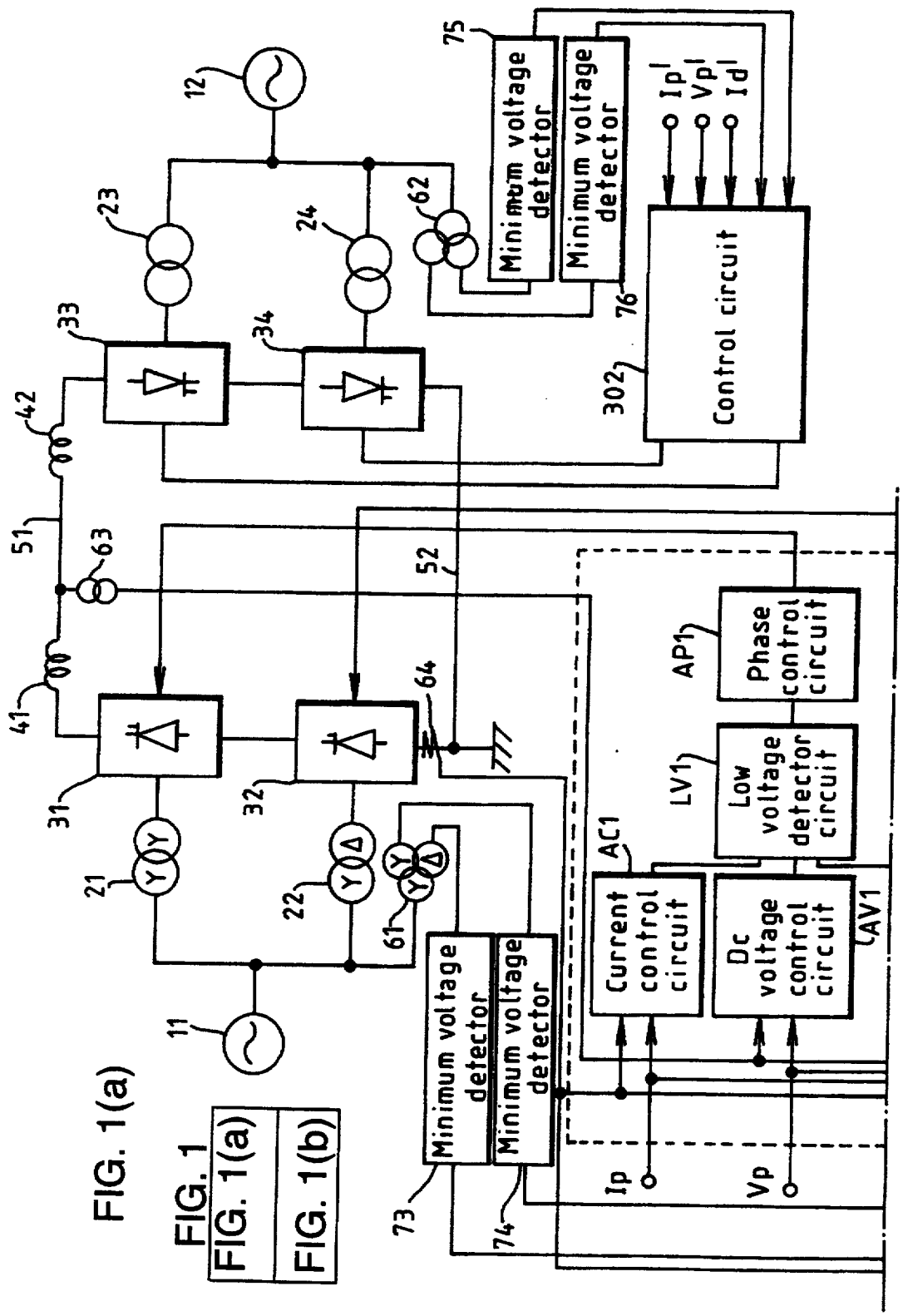
FIG. 1, which is comprised of FIGS. 1(a) and 1(b), respectively, is a schematic block diagram of a power transmission system including two power conversion systems in accordance with a first embodiment of the present invention.
Figure 1B:
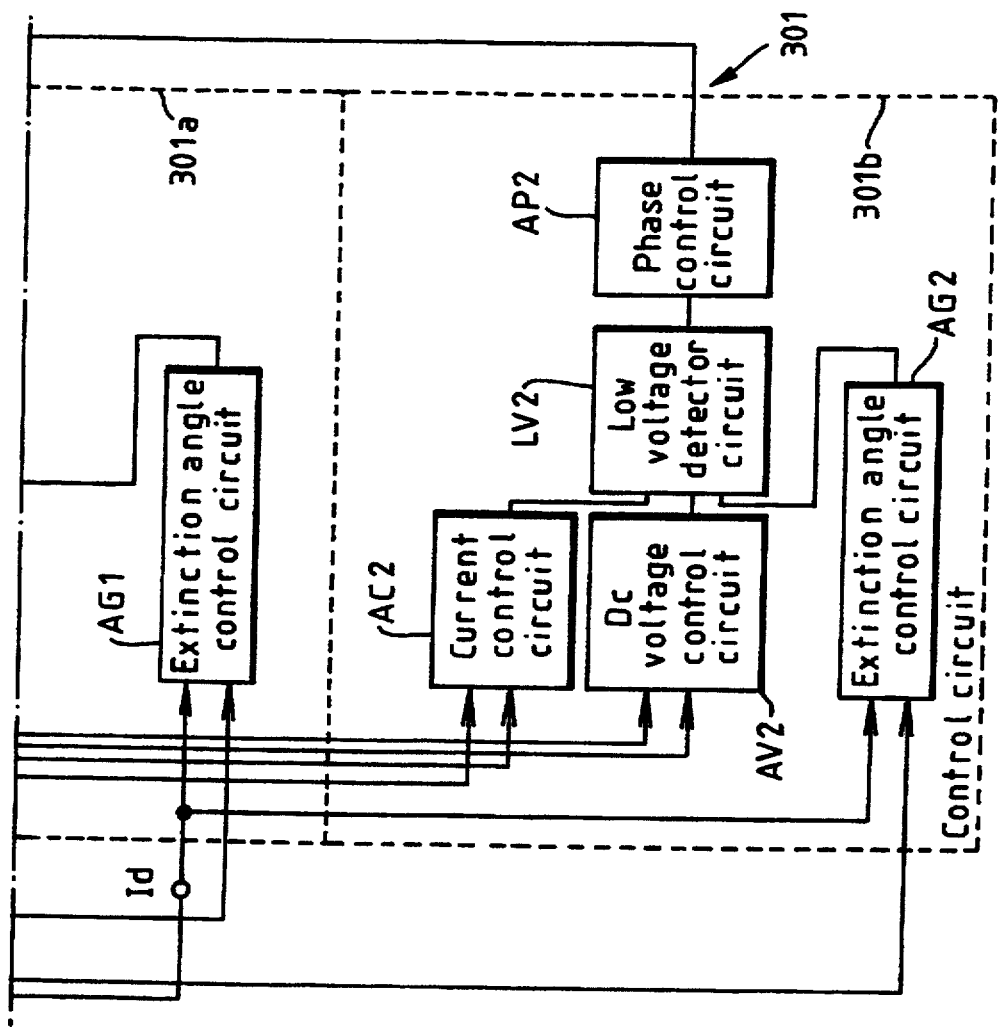

A block diagram, shown in FIGS. 1(a) and 1(b) illustrates a first embodiment of the present invention for use in a d.c. power transmission system. Two power conversion systems are connected to two a.c. systems 11,12. A first pair of converters 31 and 32 are provided for one a.c. system 11 and a second pair of line commutated converters 33 provided. The first pair of converters 31 and 32 are connected together in series, with one power converter 31 connected to the a.c. system 11 through a first transformer 21 and the other power converter 32 connected to the a.c. system 12 through a second transformer 22. Similarly, the second pair of power converters 33 and 34 are connected together in series, with one power converter 33 connected to the a.c. system 12 through a first transformer 23 and the other power converter 34 connected to the a.c. system 12 through a second transformer 24. The power converters 31 and 32 and the power converters 33 and 34 are connected together by d.c. power lines 51 and 52. Each of the d.c. power lines 51 and 52 has d.c. reactors 41 and 42 therein. Each of the first transformers 21 and 23 is YY-connected. Each of the second transformers 22 and 24 is YΔ-connected. Each of the power converters 31, 32, 33, and 34 are constructed to convert d.c. power to a.c. power or a.c. power to d.c. power. The resulting structure, and the detail structure of the parts thereof is known and is thus not described in further detail.

To control the operation of the power converters 31 to 34, there are a.c. voltage detectors 61 and 62, a d.c. voltage detector 63, a d.c. current detector 64, minimum voltage detectors 73, 74, 75, and 76, and control circuits 301 and 302. Each of the a.c. voltage detector 61 and 62 is connected to both the YY-connected transformers 21,23 and the YΔ-connected transformers 22,24. Three of the detected voltages are fed by the a.c. voltage detector 61 to the minimum voltage detectors 73 and 74. The other three of the detected voltages are fed by the a.c. voltage detector 62 to the minimum voltage detectors 75 and 76.

Figure 2:
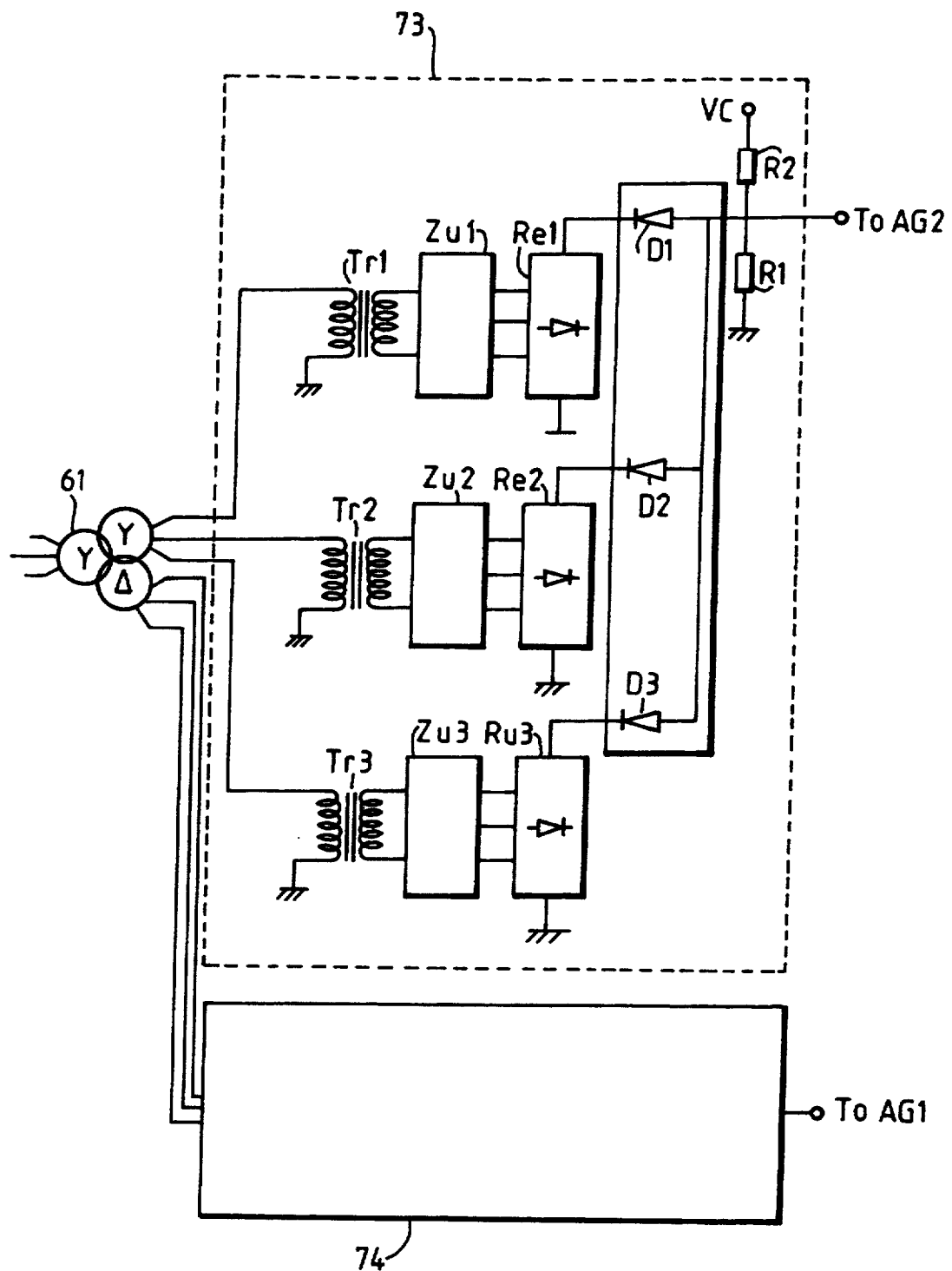
FIG. 2 is a schematic block diagram of a minimum voltage detector of the embodiment of FIG. 1.

Each of the minimum voltage detectors 73 to 76, has three transformers VXKu,, Tr2, and Tr3, zuron circuits Zu1, Zu2, and Zu3, rectifier circuits Re1, Re2, and Re3, diodes D1, D2, and D3, resistors R1 and R2. FIG. 2 shows these components only for the minimum voltage detector 73. However, the structure of the minimum voltage detectors 74 to 76 may be the same. The transformer Tr1 has a voltage of phase U input thereto, the transformer Tr2 has a voltage of phase V input thereto, and the transformer Tr3 has a voltage of phase W input thereto. Each of the zuron circuits Zu1 to Zu3 converts single-phase a.c. voltages from the respective Tr1 to Tr3 to three-phase a.c. voltages. The converted a.c. signals are fed to the rectifier circuits Re1, Re2, and Re3. The minimum one of the output voltages of the rectifier circuits Re1, Re2, and Re3 is applied across the resistor R1. Hence, the a.c. voltage detector 61 and minimum voltage detectors 73 and 74 act as a minimum voltage detecting means for detecting the minimum values of commutation currents applied to the phase commutated converters 31 and 32 respectively. Similarly, the a.c. voltage detector 62 and the minimum voltage detector 75 and 76 act as a minimum voltage detecting means for detecting the minimum value of commutation currents applied to the phase commutated converters 33 and 34 respectively. The voltages detected by the minimum voltage detectors 73 to 76 are fed to respective control circuits 301 and 302 together with the detected voltage of the d.c. voltage detector 63 and the detected voltage of the d.c. current detector 64. Again, it should be noted that the structure shown in FIG. 2 is, in itself, already known and thus its operation will not be described in detail.

As can be seen from the diagram of FIGS. 1(a) and 1(b), the control circuit 301 has current control circuits AC1 and AC2, d.c. voltage control circuits AV1 and AV2, extinction angle control circuits AG1 and AG2, low voltage detector circuits LV1 and LV2, and phase control circuits AP1 and AP2. The control circuit 302 has the same structure as the control circuit 301, and therefore only the control circuit 301 is described below.

Each of the current control circuits AC1 and AC2 generates a current control signal corresponding to the difference between a reference current command value Ip and the detected value of the d.c. current detected by the detector 64. The signals generated by the current control circuits AC1, AC2 are fed to the respective low voltage detector circuits LV1 and LV2. Similarly, the d.c. voltage control circuits AV1 and AV2 generate d.c. voltage control signals corresponding to the difference between a reference voltage command value Vp and the voltage detected by the d.c. voltage detector 63. Again, the signals generated are fed to the low voltage detector circuits LV1 and LV2, respectively. The extinction angle control circuits AG1 and AG2 generate extinction angle control signals for controlling the respective extinction angles of the power converters 31 and 32, and operate in dependence on the voltages detected by the minimum voltage detectors 73 and 74 and the currents detected by the current detector 64, respectively. The extinction angle control signals are fed out to the low voltage detector circuits LV1 and LV2, respectively.

Figure 3:
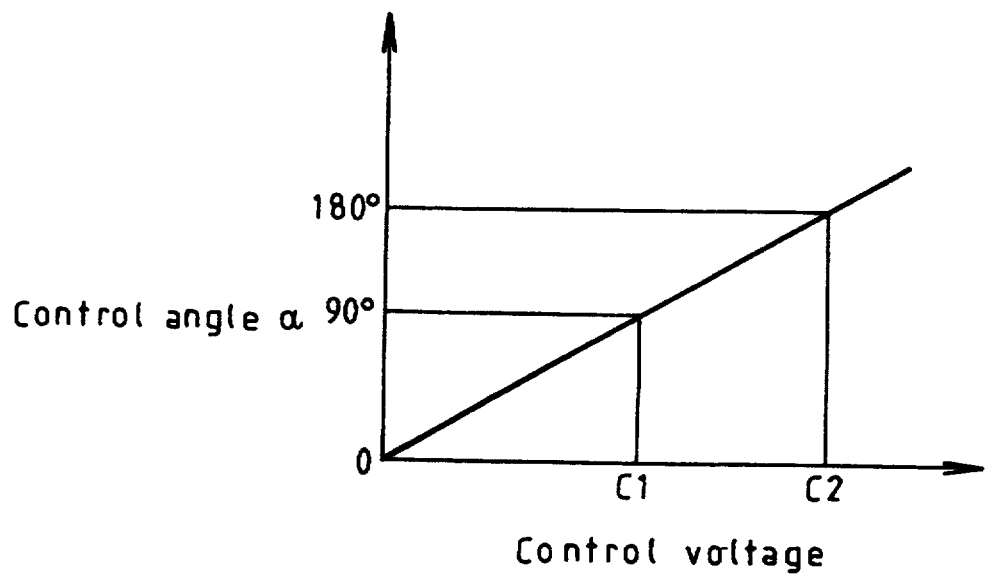
FIG. 3 is a graph showing the relationship between the control angle α and control voltage.

The current control signals, the dc voltage control signals and the extinction angle control signals are voltage signals. The levels of these signals are normally set as shown in FIG. 3. Thus, the current control signals are set to be lower than a control voltage C1($\alpha=90°$) because the reference current command value Ip is nearly the same as the currents measured by the current detector 64 and current errors are small. On the other hand, the outputs of the dc voltage control circuits AV1, AV2 saturate because the dc reference voltage command value Vp differs significantly from dc voltages measured by the dc voltage detector 63. Voltage errors become large at a rectifier side. The output of the extinction angle control circuits are about 145° in normal conditions. Hence, the outputs of the current control circuits may be selected as rectifier control circuits. The power converters 31 and 32 can then be operated as a rectifier.

For power converters 33 and 34, the outputs of the current control circuits AC1, AC2 saturate because reference outputs command value Ip of an inverter conversion circuit is smaller than that of a rectifier conversion circuit by a current margin $\Delta$Id and current errors exist. So the outputs the current control circuits AC1, AC2 saturate due to the high gain of the current controller. The outputs of the dc voltage control circuits are nearly 140° because the dc reference voltage command value Vp is nearly the same as the measured dc voltage. The outputs of the extinction angle control circuits are again around 145° in normal conditions. Hence, the outputs of the voltage control circuits AV1, AV2 are selected at the inverter control circuit. The power converters 33 and 34 can thus be operated as an inverter. The voltage control signals are set at higher than a control voltage C1 ($\alpha=90°$) but lower than a control voltage C2 ($\alpha=180°$).

Thus, in normal operation, each low voltage detector circuit LV1, LV2 selects output of the dc current control circuits AC1, AC2 when the corresponding line commutated converters 31,32 or 33,34 are acting as rectifiers, and selects the output of the dc voltage control circuits AV1, AV2 when the corresponding line commutated coverters 31,32 or 33,34 are acting as inverters. Since the low voltage detector circuits LV1, LV2 thus select the same output (with the inputs to the dc current control circuits AC1 and AC2 are the same and the input to the dc voltage control circuits AV1, AV2 are the same), the same outputs are generated by the phase control circuits AP1, AP2.

Therefore, outputs of the extinction angle control circuit are selected by the low voltage detector circuits LV1, LV2 when the ac voltages fall due to an ac line fault or dc currents increase due to a dc line tailt. The outputs of the current control circuits of the inverter control circuit are selected when the dc currents are reduced due to an ac voltage drop due to rectifier-side ac faults. The control modes are thus changed automatically by the opeartion of the voltage detector circuits LV1 and LV2 in the control circuits 301, 302.

Figure 4:
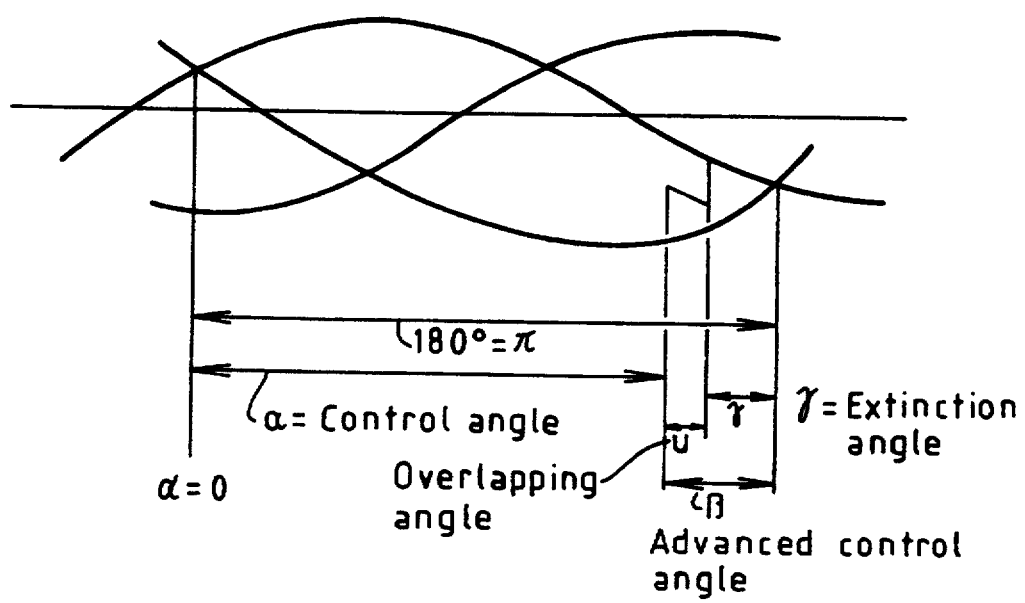
FIG. 4 is a graph illustrating the relationship between the advanced control angle and the extinction angle in control of the line commutated converters in the embodiment of FIG. 1.

The extinction angle control signals, as shown in FIG. 4 are set between the control voltage C1 and C2 ($\alpha=180°$) to maintain the normal value of the extinction angles of the tyhristors forming the line commutated converters 33 and 34. It can be seen from FIG. 4 that the extraction angle is the difference between the advanced control anlge (180° moving the control angle and the overlapping angle which is the angle for which all the thyristors of the line communtated converter are on. These terms are conventional in the art. Thus, when there is a fault, the low voltage detection circuits LV1, LV2 select the outputs of the extinction angle control circuits AG1, AG2 for transmission to the corresponding phase control circuits AP1, AP2. The inputs to the two extinction angle control circuits AG1, AG2 are different. Although they both receive the output of the dc current detector 64, they also receive the outputs of the minimum voltage detectors 73, 74 or 75, 76, which are different because they are respectively derived from the YY and YΔ transformers 21,22. Hence the outputs of the phase control circuits AP1, AP2 are different, and the line communated converters 31, 32 or 33, 34 are controlled independently.

Thus, the lowest voltage detector circuit LV1 act as a first control signal selecting means, receiving signals from the current control circuit AC1, the voltage control circuit AV1, and the extinction angle control circuit AG1, and selecting the signal of the lowest level. The selected signal is then supplied to the phase control circuit AP1. Similarly, the low voltage detector circuit LV2 acts as a second control signal selecting means, receiving signals from the current control circuit AC2, the voltage control circuit AV2, and the extinction angle control circuit AG2 and selecting the signal of the lowest level. The selected signal is then fed to the phase control circuit AP2. The phase control circuit AP1 then acts as a first phase control signal generating means to generate a phase control signal depending on the signal received from the low voltage detector circuit LV1. The phase control signal is supplied to the line commutated converter 31. Similarly, the phase control circuit AP2 acts as a second phase control signal generating means to generate a second phase control signal depending on the signal received from the low voltage detector circuit LV2. The second phase control signal is supplied to the line commutated converter 32. With the phase control signals fed to the respective line commutated converters 31 and 32, the advanced control angles of the thyristors forming the line commutated converters 31 and 32 are controlled sequentially to make line commutated converters 31 and 32 operate as rectifiers or inverters, as appropriate.

Thus, in the embodiment of FIGS. 1(a) and 1(b), the phase control circuit 301 has two independent control channels 301a, 301b respectively. The channel 301a of the phase control circuit 301 receives the output of the minimum voltage detector 74 which receives a YΔ signal, and controls the line commutated converter 31. Similarly, the channel 301b of the control circuit 301 receives the output of the minimum voltage detector 73, which receives a YY output, and controls the other phase commutated converter 32. In fact, each channel 301a, 301b of the phase control circuit corresponds to the structure of the known control circuit. In the known arrangements, a single minimum voltage is detected, and a common phase control signal is used to control both the line commutated converters 31,32. Hence, the operation of each channel 301a,301b of the control circuit 301 will be readily appreciated by those skilled in the art. Unlike the prior art arrangements, however, the phase commutated converters 31,32 are controlled independently by the channels 301a, 301b of the control circuit 301 when there is a fault.

The operation of the power transmission system of FIGS. 1(a) and 1(b) will now be described, assuming that the line commutated converters 31 and 32 are used as inverters and the line commutated converters 33 and 34 used as the rectifiers.

When the line commutated converters 31 and 32 are used as inverters and the line commutated converters 33 and 34 are used as the rectifiers, the current command value $Ip^1$ is given a current value lower than the current command value Ip. The low voltage detector circuit LV1 of the control circuit 302 selects the current control signal so that the power converters 33 and 34 are run as the rectifiers. On the other hand, the low voltage detector circuit LV1 of the control circuit 301 selects the d.c. voltage control signal so that the power converters 31 and 32 are run as the inverters. Thus, in the control circuit 301, if the current command value Ip is set at a command value corresponding to inverter operation, the detected current of the current detector 64 becomes lower than the current command value Ip. As the control voltage is saturated at a high value, the d.c. voltage control signal is selected in place of the current control signal. The phase control signal depending on the d.c. voltage control signal, is then is generated. The power converters 31 and 32 are run as the inverters depending on the phase control signal.

On the other hand, if the system voltage is changed due to a fault in the a.c. system 11 while the power converters 31 and 32 are run as the inverters, three of the six phase voltages are detected by the minimum voltage detector 73, and the other three phase voltages are detected by the minimum voltage detector 74. The extinction angle control circuits AG1 and AG2 then generate the extinction angle control signals on the basis of the detected voltages of the minimum voltage detectors 73 and 74 and the detected voltage of the d.c. current detector 64. Also, each of the current control circuits AV1 and AV2 generates the d.c. voltage control signal in dependence on the difference of the voltage command value Vp from the detected voltage of the d.c. voltage detector 63. The level of the d.c. voltage control signal becomes high when there is a decrease in the detected voltage. If the level exceeds a preset level, the low voltage detector circuit LV1 selects the extinction angle control signal. The phase control signal is generated in dependence on the extinction angle control signal. The line commutated converters 31 and 32 are then controlled in dependence on the phase angle control signal.

In the generation of the phase angle control signals, commutation voltages are detected as given by Equation (1) to (3) below.

Figure 5A:
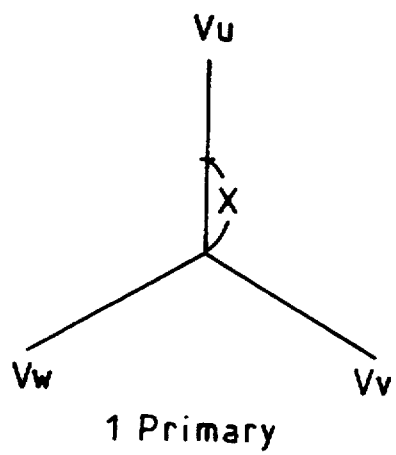
FIGS. 5(a) to 5(d) are diagrams showing commutation voltages when an a.c. fault occurs, FIG. 5(a) illustrating the voltages on the YY primary side, FIG. 5(b) illustrating the voltages on the YY secondary side, FIG. 5(c) illustrating the voltages on the YΔ primary side, and FIG. 5(d) illustrating voltages on the YΔ secondary side.
Figure 5B:
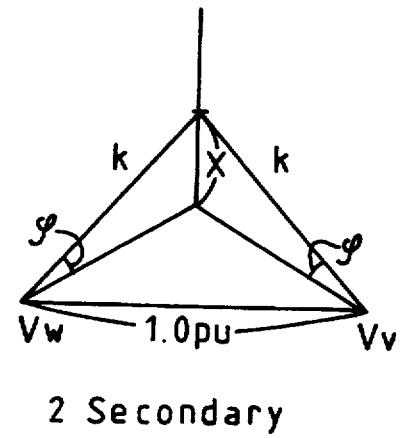
Figure 5C:
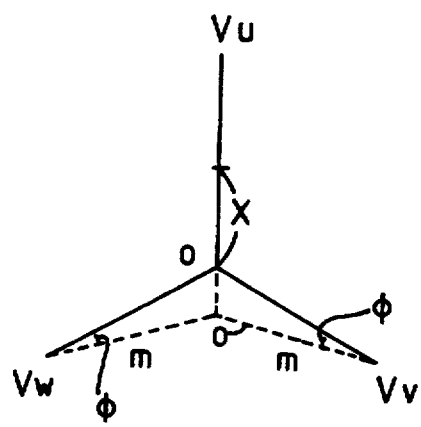
Figure 5D:
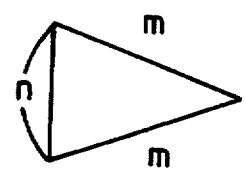

For example, FIGS. 5(a) to 5(d) show the commutation voltages applied to arms of thyristors of the line commutated converters 31 and 32 if a phase U voltage of the a.c. power line is reduced to Xp.u due to a single-phase grounding fault in the a.c. system 11. FIGS. 5(a) and 5(b) show the commutation voltages when the transformer 21 is YY-connected. FIGS. 5(c) and 5(d) show the commutation voltages when the transformer 22 is YΔ-connected. It can be seen from FIGS. 5(a) and 5(b) that, when the transformer 21 is YY-connected, the commutation voltages of line voltages become k, k, and 1.0 p.u if the phase U voltage is lowered from 1.0 p.u to Xup.u. The commutation voltage k is given by Equation 1 below:

$$k=(X^2+X+1)/3 \qquad \text{Equation (1)}$$

On the other hand, as shown in FIGS. 5(c) and 5(d), when the transformer 22 is YΔ-connected, the zero point of a voltage on the primary side is shifted, with zero phase difference, to a position O'. The commutation voltages of the line voltages, then, become m, m, and n as given in Equations (2) and (3) below:

$$m=(X^2+X+7)/3 \qquad \text{Equation (2)}$$

$$n=(2X+1)/3 \qquad \text{Equation (3)}$$

Figure 6:
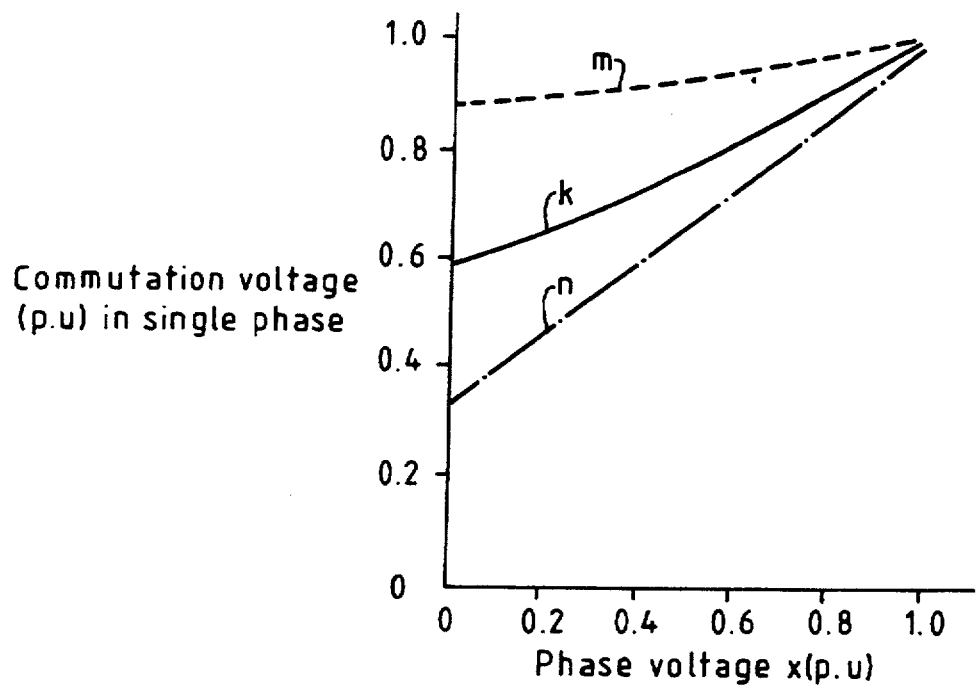
FIG. 6 is a graph showing the relationship between commutation voltage and phase voltage for a single phase fault.

FIG. 6 shows characteristics of the commutation voltages k, m, and n for the grounded phase voltage in the single-phase grounding fault.

As can be seen from FIG. 6, the commutation voltages applied to the line commutated converters 31 and 32 are different if the windings of the transformers 21 and 22 are different. Thus, in the present invention, to detect minimum values of the commutation voltages applied to the line commutated converters 31 and 32, the a.c. voltage detector 61 and the minimum voltage detector 74 detect the minimum value of the commutation voltage applied to the line commutated converter 32, and the a.c. voltage detector 61 and the minimum voltage detector 73 detect the minimum value of the commutation voltage applied to the line commutated converter 31. Using the minimum values of the commutation voltages applied to the line commutated converters 31 and 32, the extinction angle control circuits AG1 and AG2 generate the respective extinction angle control signals. The phase control circuits AP1 and AP2 then generate the advanced control lead angles to keep the extinction angles as close as possible to the normal values thereof. Therefore, as the minimum voltages of the detected values on the YY side and the YΔ side are obtained, for generating the extinction angles for the line commutated converters 31 and 32 are the transformer 21 having a smaller commutation voltage drop receives an appropriate advanced control angle to keep the extinction angle at the normal value thereof on the basis of the commutation voltage. Further, as the advanced control angle does not need to be as high for the transformer 21, as compared with that for transformer 22, the output of the line commutated converter 31 can be made greater than that of the line commutated converter 32.

To express this another way, the minimum voltage detectors 73,74 detect the commutation voltage drop for the transformers 21,22 which, as can be seen from FIG. 6, are different. Hence, the phase control circuit AP1,AP2 will generate different phase control signals to the line commutated converters 31,32 and control each appropriately. In the known systems, where there was only one minimum voltage detector, that minimum voltage detector inevitably detected the lowest commutation voltage from both transformers 21,22 (i.e. corresponding to the commutation voltage n in FIG. 6). Based on this minimum commutation voltage, a single phase control signal was generated to control both line commutated converters 31,32. Thus, although one of the line commutated converters 31,32 was operated on the basis of this minimum voltage, the other was operated on the basis of commutation voltage less than its minimum. Thus, the correction to the extinction value applied thereto was not optimum. As a result, the power conversion by the power converter was less than can be achieved by the present invention.

The above description illustrates the case of a single-phase grounding fault. The power conversion system operates in a similar way for a two-phase grounding fault. Commutation voltages are independently detected for the YY and YΔ connections. Extinction angle control signals are generated on the basis of the minimum voltages of the commutation voltages applied to the line commutated converters 31 and 32. The advanced control angles can be obtained depending on the extinction angle control signals. The transformer side having the smaller commutation voltage drop, then receives a signal which keeps the extinction angle thereof at the normal value on the basis of the commutation voltage.

Also, the embodiment described above can operate stably without commutation failure as the advanced control angle is obtained with reference to the minimum values of the commutation voltages applied to the line commutated converters 31 and 32.

When the extinction angle control circuits AG1 and AG2 generate extinction angle control signals, the advanced control angle can be obtained in terms of a minimum excess angle Ymin in accordance with Equation (4) below. Furthermore, an approximation is made on the basis of the calculated values, and the advanced control angle can be obtained in terms of the commutation voltage E2 and a d.c. current Id in accordance with a linear approximated equation.

$$\cos = \cos \min - X \, Id/E2 \qquad \text{Equation (4)}$$

Alternatively, the control lead angle can be obtained by integrating the commutation voltage as described by Sanpo, "D.C. Power Transmission and Frequency Conversion," Denki Shoin Co., Ltd., p.83.

As described above, this embodiment uses a construction in which the low voltages of the output voltages of the current control circuits AC1 and AC2 and the current control circuits AV1 and AV2 are detected. The reason is that the construction can then automatically switch over the line commutated converters 31 and 32 from rectifier operation to inverter operation and vice versa by use of a command value. Also, as described above, the embodiment has a construction in which the low voltages of the output voltages of the extinction angle control circuits AG1 and AG2 are detected. The reason for this is that the construction permits the advanced control angle can be made large automatically, to increase the extinction angle (make the delay control angle small), and thus to prevent unstable operation if the extinction angle is decreased at the time of a system fault.

Figure 7:
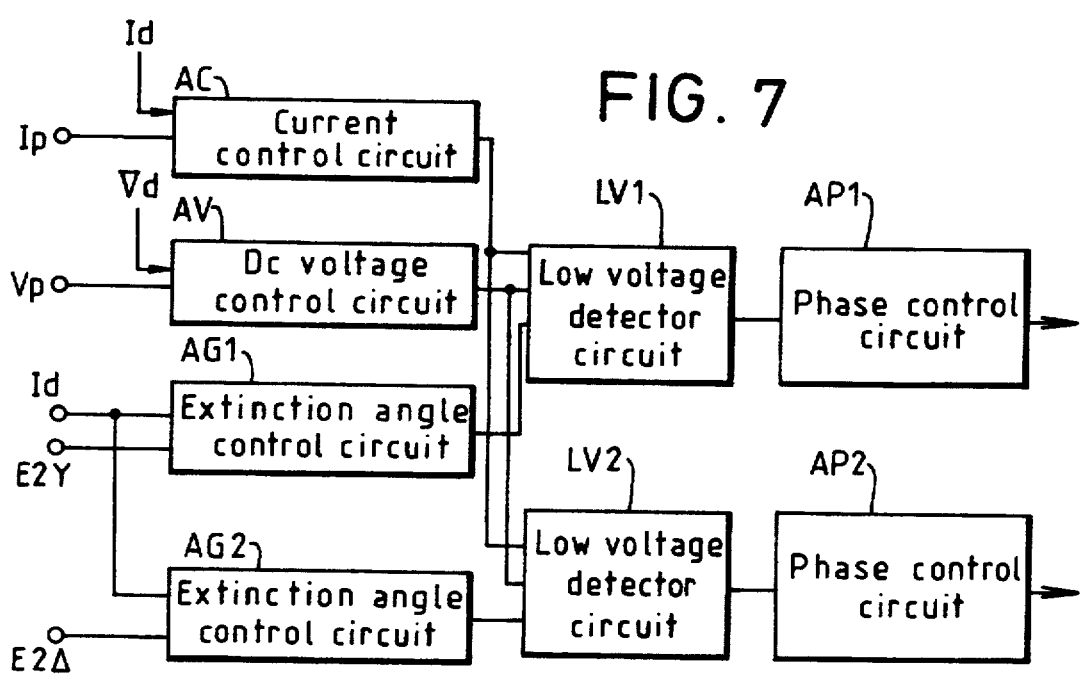
FIG. 7 is a block diagram of a control circuit of a second embodiment of the present invention.

Another embodiment of the invention will now be described by reference to FIG. 7.

This embodiment is the same as the embodiment in FIG. 1 except that the current control circuits AC1 and AC2 in FIG. 1 are replaced by a common current control circuit AC and the current control circuits AV1 and AV2 are replaced by a common current control circuit AV. Other components are the same as those of the embodiment of FIGS. 1(a) and (b), and are indicated by the same reference numerals. As the currents flowing in the d.c. systems of the line commutated converters 31 and 32 are common to the line commutated converters 31 and 32 and as the d.c. voltages are same for the power converters 31 and 32 in the stable state, the currents and the d.c. voltages can be used in common. However, two extinction angle control circuits AG1 and AG2 are provided, as the commutation voltages are different for the line commutated converters 31 and 32 connected to the YY and YΔ transformer windings at the time of a fault on the a.c. system.

In this second embodiment, as in the first embodiment, the minimum values of the commutation voltages applied to the respective line commutated converters 31 and 32 are obtained. Depending on the minimum values, appropriate extinction angle control signals are generated. Advanced control angles depending on the extinction angle control signals are obtained. Thus, operation can be made stable without commutation failure even in the event of a fault in the a.c. system. Also, the conversion power can be made higher at the time of such a fault.

The embodiments described above have low voltage detector circuits LV1 and LV2 used therein to select the minimum values. Alternatively, the current control circuits AC1 and AC2, the d.c. voltage control circuits AV1 and AV2, and the extinction angle control circuits AG1 and AG2 can be characteristics inverse to those described with reference to FIG. 3. Then, the lowest voltage detector circuits LV1 and LV2 are replaced by the circuits that select maximum values of the output voltages of the current control circuits AC1 and AC2, the d.c. voltage control circuits AV1 and AV2, and the extinction angle control circuits AG1 and AG2. This construction can obtain the same effect as the embodiments described above.

Thus, the present invention permits the minimum value of the commutation voltage to be obtained for each of the line commutated converters. Depending on the minimum value, the extinction angle is controlled independently for each of the line commutated converters. Therefore, the present invention permits stable operation without commutation failure when there is a fault in the a.c. system. Also, the present invention can make the conversion power higher at the time of a fault.

What is claimed is:

1. A power conversion system, comprising:

first and second line commutated converters for converting between a.c. and d.c. power, said first and second line commutated converters being connected in series;

transforming means for connection to an a.c. system, said transforming means having a first part which is YY connected and a second part which is YΔ connected, said first part of said transforming means being connected to said first line commutated converter and said second part of said transforming means being connected to said second line commutated converter;

control means for generating first and second control signals for controlling said first and second line commutated converters respectively, said control means including first and second minimum voltage detection means for deriving a YY minimum voltage signal and a YΔ minimum voltage signal from said first and second parts of said transforming means respectively, said YY and YΔ minimum voltage signals being independent, and control signal production means for producing said first control signal using said YY minimum voltage signal and said second control signal using said YΔ minimum voltage signal;

d.c. current detector means for detecting the d.c. current through said first and second line commutated converters and generating a d.c. current signal;

wherein said control signal production means includes means for comparing said d.c. current signal with a reference current signal to generate a comparison signal; and said control signal production means is arranged to produce said first control signal using said YY minimum voltage signal and said comparison signal, and to produce said second control signal using said YΔ minimum voltage signal and said comparison signal.

2. A power conversion system according to claim 1, having means for detecting the d.c. voltage across said first and second line commutated converters and generating a d.c. voltage signal and said control signal production means is arranged to produce said first control signal using said YY minimum voltage signal, said d.c. voltage signal, and a reference voltage signal, to produce said second control signal using said YΔ minimum control signal, said d.c. voltage signal and said reference voltage signal.

3. A power conversion system according to claim 1, wherein said control means comprises a first control channel linking said first part of said transforming means and said first line commutated converter, and a second control channel linking said second part of said transforming means and said second line commutator converter, each of said first and second control channels comprising:

a corresponding one of said first and second minimum voltage detection means for deriving a minimum voltage signal from the corresponding parts of said transforming means;

an extinction angle control circuit receiving a corresponding one of said YY and YΔ minimum voltage signals and a d.c. current signal and generating an extinction angle control signal;

a current control circuit for generating a current control signal from said d.c. current signal and a reference current signal;

a voltage control circuit for generating a voltage control signal from a reference voltage signal and the d.c. voltage across said first and second line commutated converters;

a comparison means for comparing said extinction angle control signal, said current control signal, and said voltage control signal so as to determine the minimum signal thereof; and a phase control circuit, being part of said control signal production means, for controlling the corresponding line commutated converter on the basis of said minimum signal.

4. A power conversion system, according to claim 1, wherein said control means further includes:

a first extinction angle control circuit receiving said YY related minimum voltage signal and a d.c. current signal and generating a first extinction angle control signal;

a second extinction angle control circuit receiving said YΔ related minimum voltage signal and said d.c. current signal and generating a second extinction angle control signal;

a current control circuit for generating a current control signal from said d.c. current signal and a reference current signal;

a voltage control circuit for generating a voltage control signal from a reference voltage signal and the d.c. voltage across said first and second line commutated converters;

a first comparison means for comparing said first extinction angle control signal, said current control signal, and said voltage control signal so as to determine a first minimum signal thereof;

a second comparison means for comparing said second extinction angle control signal, said current control signal, and said voltage control signal so as to determine a second minimum signal thereof;

and wherein said control signal production means includes a first phase control circuit for controlling said first line commutated converter on the basis of said first minimum signal, and a second phase control circuit being part of said control for controlling said second line commutated converter on the basis of said second minimum signal.

5. A power conversion system, comprising:

first and second line commutated converters for converting between a.c. and d.c. power;

transforming means for connection to an a.c. system, said transforming means having a first part which is YY connected and a second part which is YΔ connected, said first part of said transforming means being connected to said first line commutated converter, and said second part of said transforming means being connected to said second line commutating converter; and control means for controlling said first and second line commutated converters respectively, said control means having first and second phase control circuits arranged to generate first and second phase control signals respectively, said first and second phase control signals being respectively a YY minimum voltage signal and a YΔ minimum voltage signal and being derived from said first and second parts of said transforming means, respectively, said first line commutated converter being connected to said first phase control circuit and being arranged to receive said first phase control signal for controlling the power conversion thereof and said second line commutated converter being connected to said second phase control circuit and being arranged to receive said second phase control signal for controlling the power conversion thereof independently of said power conversion by said first line commutated converter.

6. A power conversion system according to claim 5, wherein said control means includes a first comparison means for comparing a first plurality of signals including said YY minimum voltage signal and generating a first output to said first phase control circuit, said first output corresponding to a minimum one among said first plurality of signals, and second comparison means for comparing a second plurality of signals including said YΔ minimum voltage signal and generating a second output to said second phase control circuit, said second output corresponding to a minimum one among said second plurality of signals.

7. A method of power conversion in which power is converted between a.c. and d.c. power by first and second line commutated converters and a transforming means connected to an a.c. system, said transforming means having a first part which is YY connected and a second part which is YΔ connected, said first part of said transforming means being connected to said first line commutated converter and said second part of said transforming means being connected to said second line commutated converter said first and second line commutated converters being connected in series;

said method comprising:

deriving a YY minimum voltage signal and a YΔ minimum voltage signal from said first and second parts of said transforming means respectively, said YY and YΔ minimum voltage signals being independent;

detecting the d.c. current through said first and second line commutated converters and generating a d.c. current signal;

comparing said d.c. current signal with a reference signal and generating a comparison signal;

generating first and second control signals, said first control signal being generated using said YY minimum voltage signal and said comparison signal and said second control signal being generated using said YΔ minimum voltage signal and said comparison signal; and operating said first and second line commutated converters on the basis of said first and second control signals respectively, so as to convert between a.c. and d.c. power.

* * * * *